United States Patent
Antos et al.

[11] Patent Number: 5,867,616
[45] Date of Patent: Feb. 2, 1999

[54] POLARIZATION MODE COUPLED SINGLE MODE WAVEGUIDE

[75] Inventors: A. Joseph Antos, Elmira; Venkata A. Bhagavatula; William J. Cherenak, both of Big Flats; Dipakbin Q. Chowdhury; Daniel A. Nolan, both of Corning, all of N.Y.

[73] Assignee: Corning Incorporated, Corning, N.Y.

[21] Appl. No.: 513,260

[22] Filed: Aug. 10, 1995

[51] Int. Cl.⁶ .................................................. G02B 6/00
[52] U.S. Cl. ........................... 385/11; 385/28; 385/123; 385/124
[58] Field of Search .................. 385/11, 28, 29, 385/123, 124

[56] References Cited

U.S. PATENT DOCUMENTS

| | | | |
|---|---|---|---|
| 4,480,897 | 11/1984 | Okamoto et al. | 385/11 |
| 4,676,594 | 6/1987 | Presby | 385/28 X |
| 4,684,215 | 8/1987 | Shaw et al. | 385/4 |
| 4,742,318 | 5/1988 | Jen et al. | 333/141 |
| 4,801,189 | 1/1989 | Shaw et al. | 385/28 |
| 4,988,169 | 1/1991 | Walker et al. | 385/11 |
| 5,261,016 | 11/1993 | Poole | 385/28 |
| 5,298,047 | 3/1994 | Hart, Jr. et al. | 65/3.11 |
| 5,440,659 | 8/1995 | Bergano et al. | 385/100 |

OTHER PUBLICATIONS

Barlow et al, "Birefringence and polarization mode–dispersion in spun single–mode fibers", Applied Optics, vol. 20, No. 17, Sep. 1981.

Ramaswamy et al, "Single polarization optical fibers: Exposed cladding technique", Appl. Phys. Lett. 33(9), Nov. 1978.

*Primary Examiner*—Rodney B. Bovernick
*Assistant Examiner*—Hemang Sanghavi
*Attorney, Agent, or Firm*—William J. Chervenak

[57] ABSTRACT

A single mode optical waveguide having reduced polarization mode dispersion and a method for making such a waveguide is disclosed. Perturbations are introduced into the waveguide core to couple power between the two polarization modes. A model calculation shows that the perturbation length may be of the order of the correlation length. The inventive waveguide is robust in that polarization mode dispersion is reduced even if perturbations are impressed on the fiber after manufacture.

9 Claims, 4 Drawing Sheets

POLARIZATION MODE COUPLED SINGLE MODE WAVEGUIDE

BACKGROUND

The invention is directed to an optical waveguide fiber having reduced polarization mode dispersion (PMD), and a method for making such a waveguide fiber.

High performance telecommunications systems, i.e., those having transmission rates above about 5 Gb/s, or long regenerator spacing, with or without optical amplifiers, require waveguide fibers designed to limit all sources of signal distortion or signal power loss.

In particular, in high data rate transmission systems, essentially all sources of signal dispersion, including PMD, become potential data rate limiting factors, and must be controlled to enable such systems.

PMD may be controlled by controlling the birefringence of the waveguide fiber which causes the two polarization modes to propagate at different speeds in the waveguide fiber.

There will be no polarization mode dispersion if the waveguide fiber has perfect geometric symmetry and is free of stress which causes random birefringence.

However, it is impractical to pursue making a waveguide fiber essentially free of birefringence from the standpoint of cost and process control. Further, given a perfect glass waveguide fiber, birefringence, and thus PMD, can be induced in any of the several additional process steps required to put the glass waveguide into a usable form. Thus, birefringence can be induced in the coating, buffering, stranding or cabling process.

A practical alternative method for limiting PMD is to introduce birefringence into the waveguide fiber in a controlled way so that the polarization modes are mixed and therefore have travel times in the waveguide which may differ only slightly. An alternative statement is, the two polarization modes experience essentially little or no net birefringence over a pre-selected waveguide fiber length.

One approach to introducing birefringence into a waveguide fiber is discussed in "Applied Optics", Ashkin et al., Vol. 20 (13), page 2299. In that article a particular birefringence is impressed on the fiber by spinning the draw preform during draw.

In U.S. Pat. No. 5,298,047, Hart et al., a method for impressing a spin on the fiber during draw is disclosed. The number of required spins/meter is stated as being related to the beat length of the waveguide fiber.

It is noteworthy that both cited references teach that the periodicity of the spin must be less than the beat length of the wavelength.

The major drawbacks in a spinning technique during draw are:

- at a reasonable draw speed the spinning rate is very high, thereby introducing perturbations into a drawing process which is already a complex and sensitive step in the waveguide manufacturing process;
- an additional draw control loop is required; and,
- waveguide costs are increased as percent good waveguide length decreases, at a step which occurs after significant investment in raw material and energy has already been made.

DEFINITIONS refractive index profile describes the variation of glass refractive index along a waveguide fiber radius.

Birefringence is a property of a light propagating material wherein the speed of light in the material is dependent upon the orientation of the electric field vector of the light in the plane perpendicular to the direction of propagation.

A birefringence axis of a material is an imaginary line in a plane perpendicular to the direction of light propagation. Light launched with its electric field vector along this axis experiences a particular index of refraction, i.e., has a particular phase velocity. A linear birefringent material has two such axes.

Beat length of a waveguide fiber is the length required for a particular light polarization to repeat. For example, the first beat occurs at a distance along the fiber where the light polarization is again oriented as it was at launch.

Correlation length of a waveguide fiber is the length at which the dependence of PMD, expressed as ps/km, transitions from a linear to a square root dependence on length.

SUMMARY OF THE INVENTION

The present invention meets the need for an optical waveguide fiber wherein PMD is controlled in a manner which is largely independent of process steps carried out after waveguide production, e.g., buffering or cabling. Further, the instant invention does not add additional requirements to the drawing step, a process step which is already quite complicated.

A first aspect of the invention is a single mode optical waveguide fiber having a core and a clad, at least a portion of the core refractive index being greater than that of a portion of the clad refractive index. Birefringence is induced in the waveguide fiber by means disposed along the waveguide length. The birefringence means are arranged to have a mirror symmetry, where the mirror plane includes the longitudinal axis of symmetry of the waveguide. Adjacent mirror planes are made to be orthogonal to produce orthogonal axes of birefringence.

To be effective in mixing the orthogonal polarization modes of propagated light, the difference in index of refraction between the two birefringence axes is at least $1 \times 10^{-6}$.

The birefringence means are arranged along the fiber length so that the net birefringence of the fiber is essentially zero. In this way, the travel time of light in the waveguide fiber will not depend upon the orientation of its electric field vector at launch. One practical way of realizing net zero of birefringence for a waveguide fiber length is to dispose the birefringence means periodically, i.e., in segments of essentially equal length, along the waveguide.

Birefringence may be induced, for example, by causing variation, along the length of the waveguide, of ellipticity of the core, of the concentricity of the core and the clad, or of the residual stress in the waveguide.

A second aspect of the invention is the control of the required length between orthogonal changes in birefringence axes. In contrast to the art cited above, birefringence means, disposed along the waveguide fiber length, having a variation period of less than about three times the correlation length of the waveguide, are effective to produce polarization mode mixing and hence reduction in PMD.

If the length of a periodic variation of the birefringence must be close to the beat length of a waveguide, one is essentially constrained to introduce that variation during the drawing step. A typical beat length may be 10 meters or less. A millimeter length of a draw preform which is 50 mm in diameter translates into about 160 meters of waveguide fiber having a nominal diameter of 125 microns. Because of the very small dimensions which would be involved, modification of the draw preform to induce variable birefringence appears impractical.

What has been discovered in the present invention is that PMD reduction benefit can be realized for birefringence variation lengths much greater than the beat length and that the waveguide correlation length is a good base measurement for determining benefit derived from a particular birefringence variation length.

The relation between wavelength correlation length and birefringence periodic variation is calculated using a model which uses typical waveguide fiber beat length and correlation length. Beat length may vary within the length limits 2 to 40 meters and a typical beat length may be taken as 10 meters. Also, correlation length may vary between the limits 50 to 400 meters with a typical correlation length having a value of 200 meters.

A further aspect of the invention is a method for making a single mode optical waveguide fiber having the birefringence properties identified above. Because birefringence variation lengths may be longer than beat length, the geometric perturbations which cause birefringence may be induced into the core preform or into the draw preform.

A particular embodiment of the method is a core preform having grooves formed in the core preform surface. The grooves have at least one mirror plane of symmetry, which includes the longitudinal axis of the preform, and are spaced apart along the length of the preform.

The preform is overcladded to form a draw blank, which has an essentially uniform cylindrical surface, and drawn into a waveguide fiber having an essentially uniform diameter. The draw preform must have an essentially uniform cylindrical surface when the perturbations are formed in the core portion of the preform so that the perturbations appear in the core after the draw preform is drawn into a waveguide fiber of uniform diameter.

Another method for inducing birefringence includes impressing the birefringence perturbation means into the surface of the draw preform having an essentially cylindrical core preform surface. Then, drawing the preform into a waveguide of uniform diameter effectively transfers the perturbations from the draw preform surface to the core surface of the waveguide.

The conditions which determine the required surface condition of the draw preform are:

substantially all of the perturbation must be impressed on the core of the waveguide fiber; and, the waveguide fiber must be drawn to an essentially uniform diameter.

Characteristic dimensions of the grooves formed in the core or draw preform are a depth in the range of about 3% to 15% of the preform diameter, and a length along the longitudinal axis of the preform no greater than about 4 mm. In order to provide two distinct polarization axes, the circumferential extent of the groove is a length less than half the circumference of the preform and typically of the order of about one fourth the circumference of the preform.

Yet another method of making a waveguide fiber having periodically varying birefringence is contemplated. This method comprises forming a spiral groove in the waveguide core preform or draw preform. The depth and longitudinal extent, i.e., the edge to edge dimension of the spiral channel measured parallel to the preform axis, are chosen as before and the pitch of the spiral is greater than about 0.04 mm. This lower limit on pitch arises from the requirement that the perturbations not produce circular polarization of the launched light (see, Simon and Ulrich, "Applied Optics", 18, pp. 2241–2251, 1979). The upper limit on longitudinal extent of the groove is about 4 mm, as before, a limit which is set by the limits at which the perturbations are effective to mix the polarization modes.

Although the spiral channel is envisioned as being formed over the entire length of the core or draw preform, the spiral need not be formed as a continuous channel. Also the pitch, depth and longitudinal extent of a non-continuous spiral channel may vary along the core or draw preform length. However, the dimensions of the channel which is continuous or non-continuous must have a periodicity which yields an essentially zero net birefringence along each polarization axis as stated above.

An alternative design which does not cause circular polarization but has no lower limit on pitch includes corresponding preform lengths having a spiral groove wherein the pitch of the grooves have respective different directions of advance. The direction of advance of a spiral is the direction of movement along the pitch when the spiral is traversed in a clockwise direction.

DETAILED DESCRIPTION OF THE INVENTION

A major difficulty in dealing with PMD in a single mode waveguide fiber is that birefringence can be induced in a waveguide fiber at essentially any stage of the manufacture, cabling, installation or use of the waveguide. Stress induced in a coating, buffering or cabling step can produce PMD. The same is true for bending stress induced during installation or for stress induced as coating or cabling or installation materials change due to environmental factors or age.

Because the glass waveguide itself is quite stable and usually well protected in the cabling process, an attempt to reduce PMD is best directed to building low PMD into the waveguide fiber itself rather than addressing the PMD problem at the coating stage or any subsequent stage of the process.

Furthermore, because the bend stress in the glass can change during cabling, installation or use, the method used to eliminate or reduce PMD should be relatively insensitive to downstream process steps and to environmental factors which can introduce stress and, thus, birefringence into the waveguide fiber.

The uncertainty of what environment a waveguide will have over a normal lifetime, suggests that PMD may best be estimated using statistical methods. A statistical approach serves to average large local effects over a sufficient waveguide length, of the order of 20 to a few hundred kilometers, to give a more accurate predictor of PMD for an installed link.

The strategy employed in the subject invention is therefore, first, to manufacture a waveguide fiber using techniques which minimize PMD by mixing the two orthogonal polarization modes propagated in the waveguide. Secondly, for the particular fiber in question, an estimate is made as to how random birefringence affects the total PMD. Such estimates are best done in terms of ratios of performance parameters, in controlled polarization mode mixed waveguides, to standard waveguide fiber.

From experience with the environmental demands of different installations, such as undersea cable, buried cable, or suspended cable, PMD performance of a waveguide fiber over its lifetime can be made.

Figure 1A:
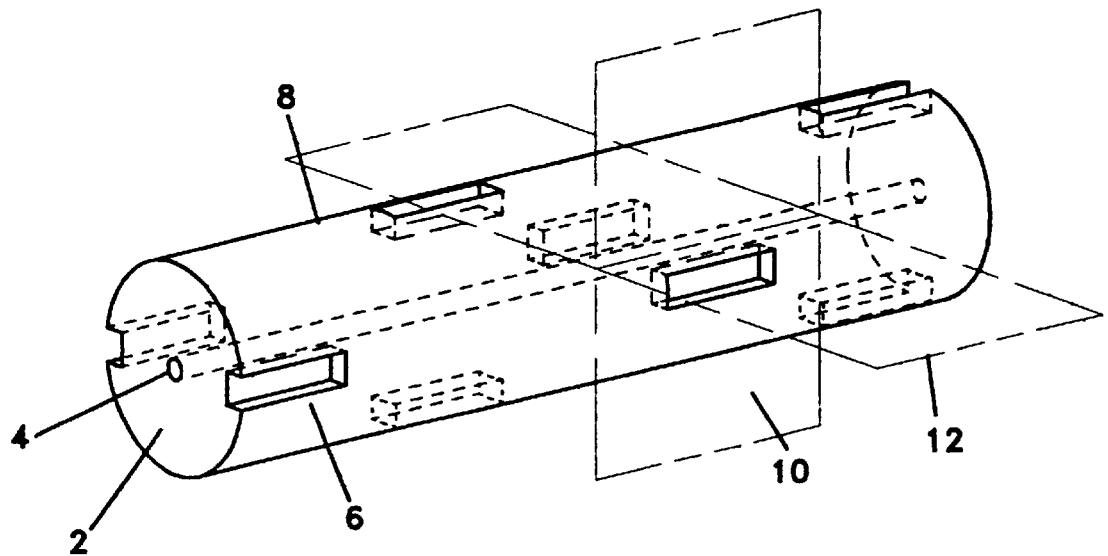
FIG. 1a shows an example of geometrical perturbations in a draw preform.

FIG. 1a shows a draw preform, having a core 4 and a clad 2, which has been prepared with pairs of grooves 6 and 8 formed in the preform surface. The grooves have a depth, a width, and a length along the waveguide fiber axis. Mirror planes 10 and 12 illustrate that adjacent pairs of grooves are orthogonal. The groove depth lies in the range of about 0.03 to 0.20 of the preform diameter. Shallow grooves are preferred, in the depth range of about 0.03 to 0.10 of the preform diameter, to limit the effect of diameter variations on other waveguide fiber parameters, such as zero dispersion wavelength or attenuation. The length of the groove is less than about 4 mm. As will be discussed below, a smaller length dimension is preferred. The width of the groove is also of the order of a few millimeters to a few tenths of millimeters. The birefringence is not as sensitive to the width dimension as it is to the length and depth dimension.

The strategy is to introduce a perturbation sufficient to provide a birefringence index difference of about $1 \times 10^{-6}$, but small enough to leave the other operating characteristics, dispersion zero, cutoff wavelength, or attenuation substantially unchanged.

When the draw preform of FIG. 1 is drawn to a uniform diameter, the surface perturbations will appear in the core diameter. The core will be made up of length sections having a particular polarization axis, i.e., a characteristic longer diameter, and adjacent sections will have corresponding polarization axes which are orthogonal. The grooves may be formed in the draw preform surface, as shown, or in the core preform surface. In this latter case the draw preform is made to have a uniform cylindrical shape. Drawing the draw preform to a uniform waveguide fiber diameter again produces perturbations in the core.

The grooves may be formed by any of several methods which may be readily implemented by one of ordinary skill in the art. Acceptable methods include, grinding, acid etching, or heating and shaping. It is usually preferred to include a polishing step after grinding or etching to provide a more uniform surface for the next process step.

Figure 1B:
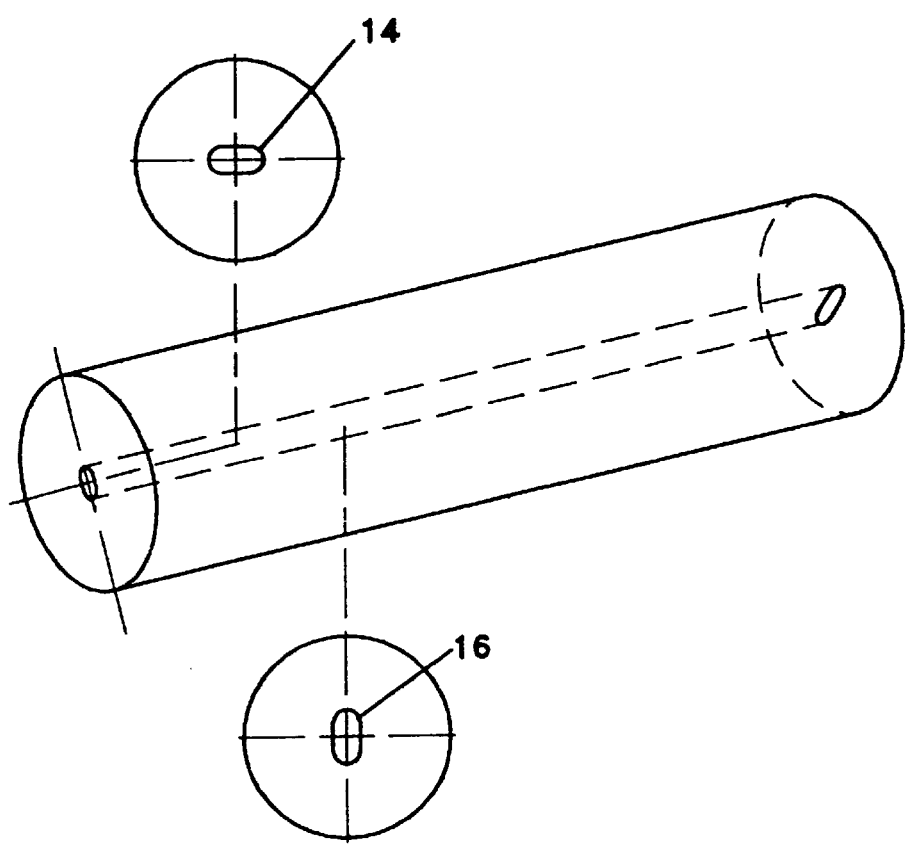
FIGS. 1b and 1c illustrate examples of perturbations in a draw preform or a waveguide fiber.

When pairs of groove are formed, as shown in FIG. 1a, the drawing step will produce an elliptical core as shown in FIG. 1b. Cross sections 14 and 16 show the orthogonally oriented ellipticity of adjacent waveguide fiber sections. Other methods of introducing ellipticity into a waveguide fiber core include, using, in a deposition process, an integral bait rod having orthogonally alternating ellipticity. Methods which include variation of preform density or viscosity are also contemplated.

Figure 1C:
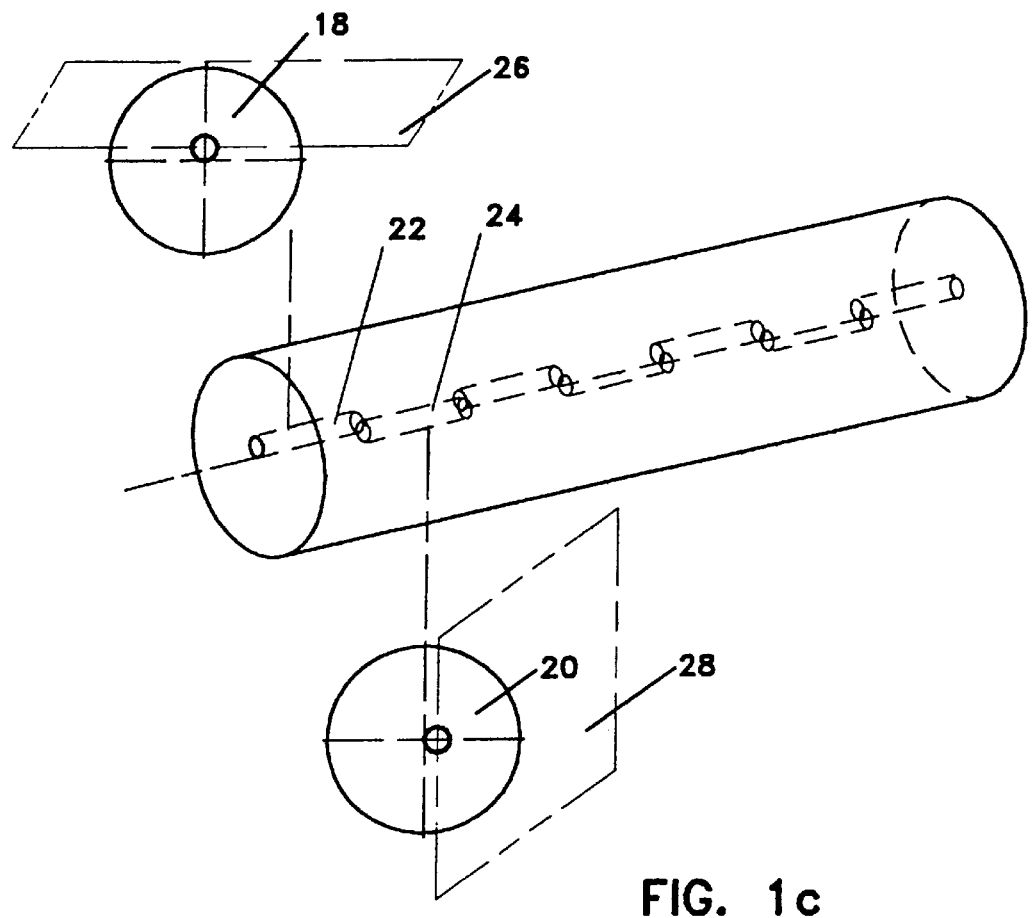

An orthogonally varying offset of the core center relative to the clad center, as illustrated in FIG. 1c, can be produced using the preform as shown in FIG. 1a, except that single grooves, instead of pairs of grooves, are formed in the core or draw perform. Adjacent grooves have respective mutually orthogonal mirror planes. As an alternative the orthogonally varying core/clad offset may be produced by using an integral bait rod having an orthogonally alternating centerline offset.

In both cases wherein the perturbations are introduced in the bait rod, i.e. the case having orthogonally alternating ellipticity or that having orthogonally alternating core clad offset, the geometry introduced in the preform step will be preserved through the draw step. Thus FIGS. 1b and 1c may represent either preforms or waveguides having the elliptical or offset perturbation.

Figure 2:
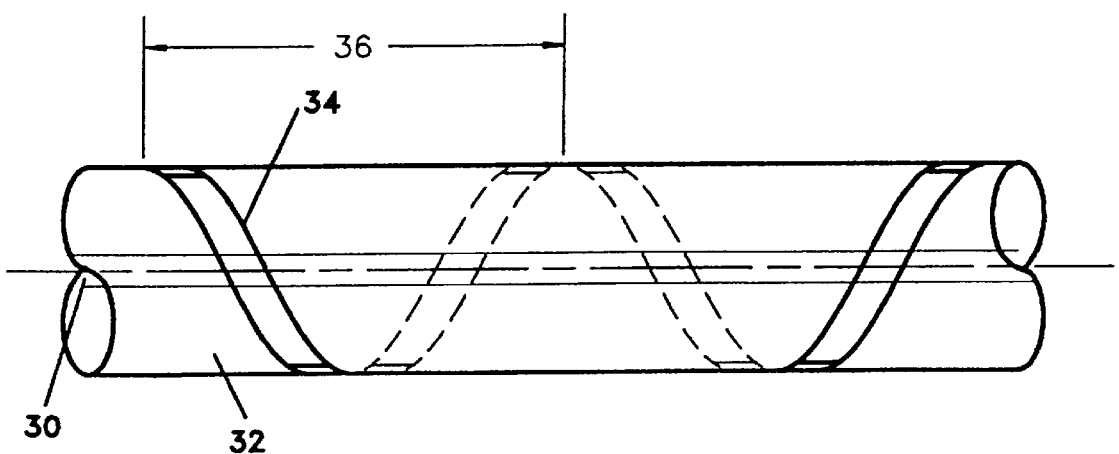
FIG. 2 is an example of a spiral perturbation in a draw preform.

Another embodiment is illustrated in FIG. 2. In this embodiment, the core perturbations are introduced by means of a spiral pattern 34 formed in the draw preform surface 32 or in the core preform surface (not shown). The limitations on the width and depth of the spiral pattern or groove are determined as discussed above in the case of spaced apart groove shaped perturbations. A lower limit on the pitch of the spiral groove is required to avoid inducing circular polarization in the launched light wave. Thus, a spiral pitch, 36, greater than about 0.04 mm is required. As before, the benefit of the polarization mode mixing perturbations decreases as the longitudinal extent of the groove increases so that a practical maximum width of the spiral is about 4 mm.

The preform perturbation approach to polarization mode mixing was generally believed to be impractical to manufacture. In a 50 mm diameter draw preform, a segment of the preform having a length of about 6 microns is drawn into an equivalent fiber length of about 1 meter. Thus, if it is required that the polarization mode mixing perturbations have a length of the order of the beat length of the single mode waveguide, i.e., of the order of about 10 meters, the length dimension of the groove formed in the draw or core preform would be in the range of about 60 microns. To form such a narrow groove in a preform surface would add considerable time and thus cost to the waveguide manufacturing process. Further, the extra, exacting, process would be expected to adversely affect the percent yield of waveguide fiber.

However, modelling of the polarization mode mixing using both controlled coupling and controlled plus random coupling models, shows that PMD control benefit can be obtained even when the length of the induced perturbations are an order of magnitude greater than the waveguide fiber beat length. By means of an averaging method, wherein an ensemble of waveguides is considered, one can show that periodic induced perturbations having lengths of the order of a few hundred meters serve to reduce ensemble average PMD.

Figure 3:
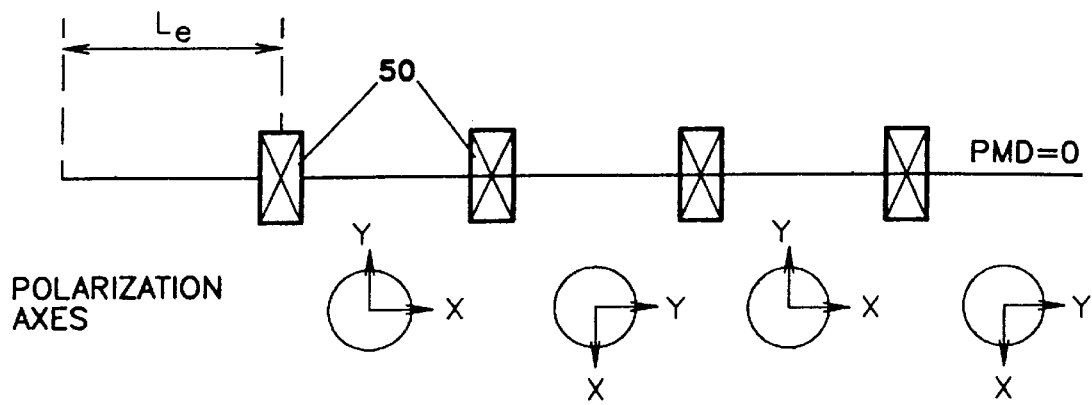
FIG. 3 is a schematic showing an ideal fiber having adjacent lengths of induced orthogonal birefringence axes.

The idealized case of a single mode waveguide fiber having no random perturbations is shown in FIG. 3. The boxes 50 indicate the starting point for a particular orientation of polarization axes in the waveguide. The particular orientation of polarization axes associated with a box 50, where box 50 is a polarization birefringence inducing perturbation, is under the waveguide fiber length after each box 50. The orientation persists over the length of waveguide fiber between adjacent boxes, i.e, polarization axis points of change.

Because there are no random perturbations, the two polarization modes of launched light have identical travel time in the waveguide and there is no PMD.

Figure 4:
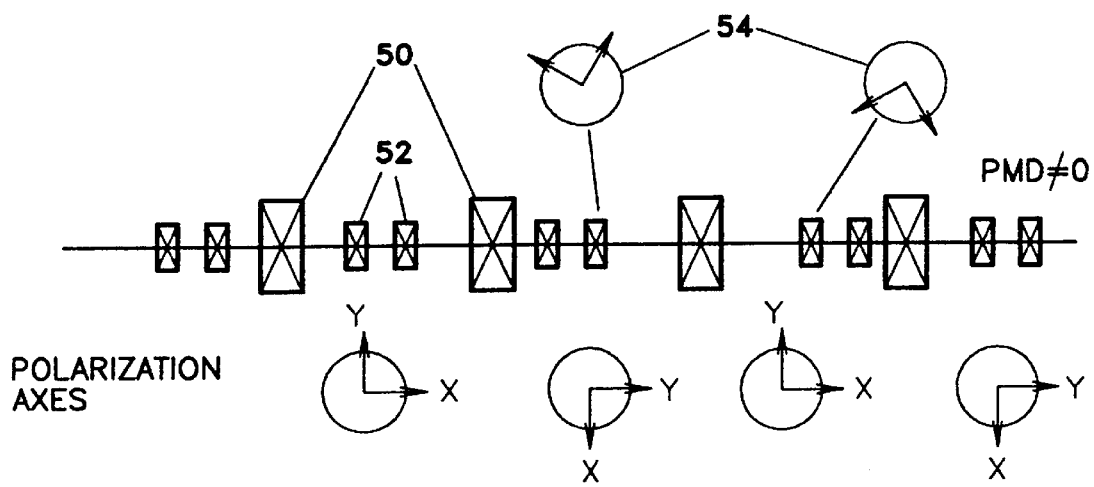
FIG. 4 is a schematic showing both random and induced birefringence along the waveguide length.

FIG. 4 is a schematic illustration of a more realistic case, where random coupling as well as controlled coupling, i.e., deliberately induced coupling, between polarization modes occurs at various points along the waveguide. The random mode coupling perturbations are shown as the smaller boxes 52. Possible orientations of polarization axes of the random coupling is shown as axes 54.

The model assumptions are:

beat length $L_b$ at 1550 nm is 10 meters;

correlation length of random perturbations $L_c$ is 200 meters;

total random inherent birefringence $B_r$ is 0.5 ps/km; and, induced perturbation length $L_e = n \times L_c$, where n is a number less than three.

The model calculation yields:

ensemble average of PMD for randomly perturbed waveguides, $P_r$;

ensemble average of PMD for waveguides having random and controlled perturbation, $P_c$;

total birefringence for waveguides having random and controlled perturbations, $B_c$; and, standard deviations $S_r$ and $S_c$, of $P_r$ and $P_c$, respectively.

Figure 5A:
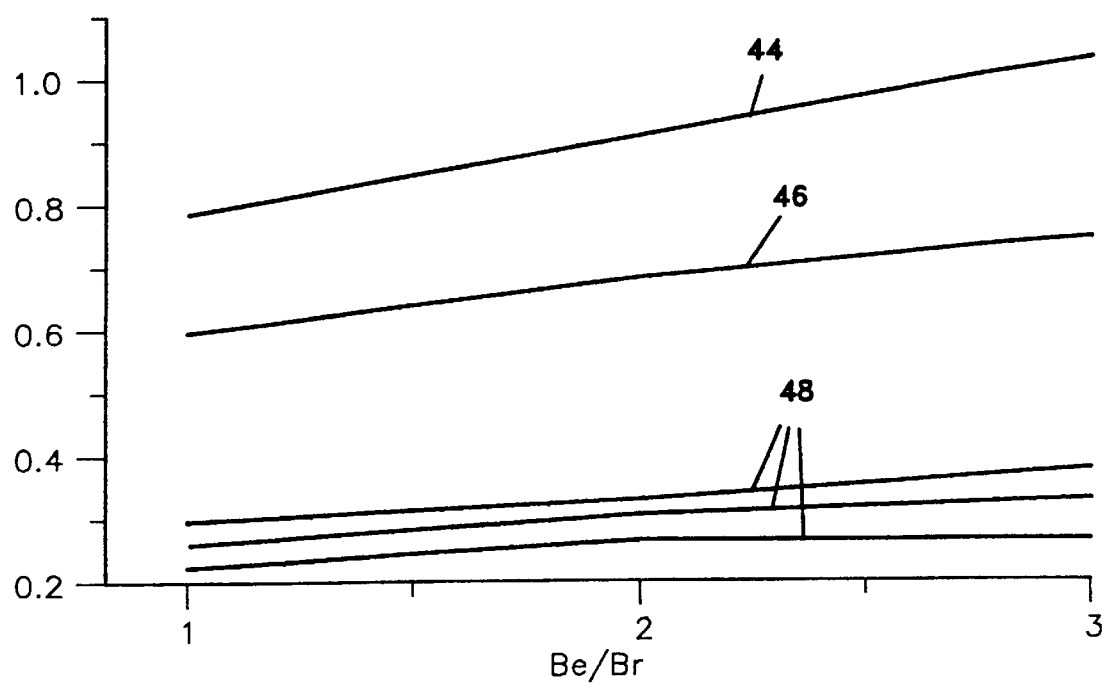
FIGS. 5a and 5b show model calculated results of the improvement in PMD provided by induced birefringence.
Figure 5B:
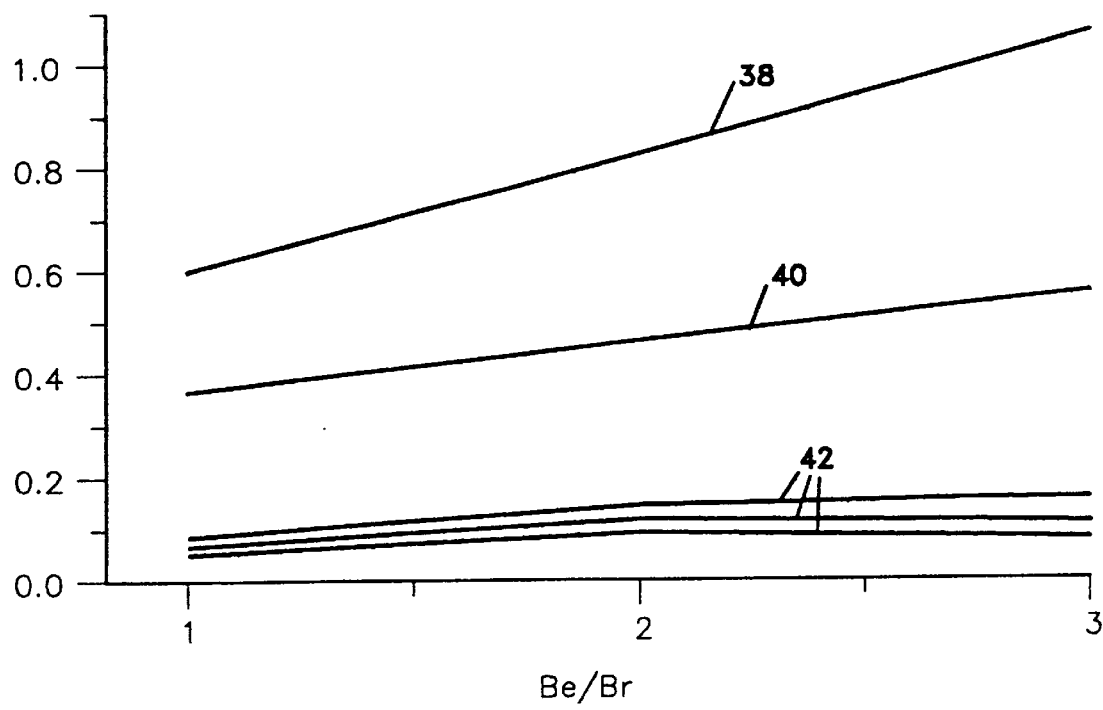

FIGS. 5a and 5b clearly show the superior performance of the inventive waveguide fiber over that of standard single mode optical waveguide fiber.

With reference to the graph, FIG. 5a, the vertical axis is the normalized ratio $P_c/P_r$ and the horizontal axis is the ratio $B_c/B_r$. The group of curves 48 show improvement in ensemble average PMD in the range of about 70% to 80% when the ratio of total birefringence before and after introducing perturbations into the waveguides is less than about three and n is the range of about 0.25 to 0.50.

Even when the controlled perturbation length is twice the correlation length, i.e., n=2, ensemble average PMD improvement 46 is in the range of about 35% to 40% when the ratio of before and after total birefringence, $B_c/B_r$, is less than three.

PMD reduction benefit from introducing birefringence continues up to n=3, as is shown in curve 44.

Controlled perturbations in the core or draw preform which translate into fiber lengths of about 50 meters are within the scope of the methods described herein, which means that performance as illustrated in curves 48 is expected.

An important aspect of curves 48 is the low slope. A factor of three increase in random total birefringence produces only about 7% increase in ensemble average PMD. Thus, the inventive waveguide fiber design is robust, in that birefringence introduced in process steps downstream of the draw produces only small changes in PMD benefit. Note that the waveguide robustness increases as perturbation length becomes a smaller multiple of correlation length.

As PMD variation from fiber to fiber increases, the sensitivity of the fiber to changes in birefringence ratio, $B_c/B_r$, also increases, as shown in FIG. 5b. In this chart the horizontal axis is again the birefringence ratio, $B_c/B_r$. The vertical axis is the ratio of standard deviations, $S_c/S_r$. Curves 42 show that controlled perturbation variations depend weakly upon birefringence ratio when n is small. Also curve 40 shows that the standard deviation ratio changes only by about 10% when birefringence ratio changes by a factor of three. Curve 38 shows a steeper rise in standard deviation ratio, about 20%, but still shows the good tolerance of the inventive waveguide to downstream perturbations which change the ratio of total birefringence for the inventive waveguide to a standard waveguide.

Thus FIGS. 5a and 5b show that the inventive waveguide provides:

large improvements in total average PMD;

improvement even for controlled perturbation lengths as long as three times the correlation length; and, relative insensitivity to variation in birefringence which may be caused by steps downstream of the drawing step.

Other means for inducing the core or clad perturbations are available or contemplated such as preferential illumination of the core or draw preform using light of a wavelength which modifies the index profile of the waveguide. For example ultraviolet light could be used.

Also the perturbations may be introduced by means of the waveguide coating, buffering or other techniques employed in the cabling step (although there are obvious disadvantages, i.e., changes due to handling or to environment, of these alternatives). Further, one can envision introducing the perturbations in the installation step for certain applications, e.g., an application in which the cabled fiber is installed in a flexible conduit.

Although specific embodiments of the invention have hereinbefore been disclosed and described, it will be understood that the scope of the invention is nevertheless to be defined by the following claims.

What is claimed is:

1. A single mode optical waveguide fiber, having a long axis, which transmits a light wave having two orthogonal polarization modes, comprising:

a core glass, region having a refractive index profile;

a clad glass layer, surrounding said core glass region and having a refractive index profile, wherein at least a portion of said core glass refractive index profile is greater than at least a portion of said clad glass refractive index profile, said waveguide fiber having a longitudinal axis of symmetry; and, a plurality of birefringence means built into the waveguide fiber and disposed periodically along the waveguide fiber long axis to couple power between the two orthogonal polarization modes of light transmitted through the waveguide fiber.

2. The single mode waveguide fiber of claim 1 wherein said birefringence means have at least one mirror plane of symmetry which includes the longitudinal axis of symmetry so that a first polarization axis is in the mirror plane and a second polarization axis is perpendicular to the mirror plane.

3. The single mode waveguide fiber of claim 2 wherein said birefringence means which neighbor each other along the waveguide fiber length have their respective mirror symmetries rotated by 90° relative to each other.

4. The single mode waveguide fiber of claim 3 wherein said birefringence means provides a refractive index difference of at least $1 \times 10^{-6}$ between the two polarization axes.

5. The single mode waveguide fiber of claim 4 wherein said birefringence means is variation in ellipticity of said core region.

6. The single mode waveguide fiber of claim 4 wherein said birefringence means is refractive index difference induced by stress in the waveguide fiber.

7. The single mode waveguide fiber of claim 4 wherein said birefringence means is variation in concentricity of said core region and said clad layer.

8. A single mode optical waveguide fiber, having a long axis, which transmits a lightwave having two orthogonal polarization modes, comprising:

a core glass region having a refractive index profile;

a clad glass layer, surrounding said core glass region and having a refractive index profile, wherein at least a portion of said core glass refractive index profile is greater than at least a portion of said clad glass refractive index profile, said waveguide fiber having a longitudinal axis of symmetry; and, a plurality of birefringence means, each having a length, $L_e$, said birefringence means being built into the waveguide fiber and disposed periodically along the waveguide fiber long axis to couple power between the two orthogonal polarizations modes of light transmitted through the waveguide fiber;

said waveguide fiber having a beat length, $L_b$, and a correlation length, $L_c$;

wherein $L_e = n \times L_c$, and n is a number no greater than about three.

9. The single mode waveguide fiber of claim 8 wherein the beat length is in the range of about 2 to 40 meters and the correlation length is in the range of 50 to 400 meters.

* * * * *